US005506996A

United States Patent [19]
Wang et al.

[11] Patent Number: 5,506,996
[45] Date of Patent: Apr. 9, 1996

[54] CHAOS PROCESSOR FOR CALCULATING A CORRELATION DIMENSION

[75] Inventors: Bo-Hyeun Wang; In T. Kim; Hyung S. Kim, all of Kyungki-Do, Rep. of Korea

[73] Assignee: Goldstar Co., Ltd., Rep. of Korea

[21] Appl. No.: 106,875

[22] Filed: Aug. 16, 1993

[30] Foreign Application Priority Data

Jun. 18, 1993 [KR] Rep. of Korea ............... 11190/1993

[51] Int. Cl.$^6$ ........................................... G06F 15/336
[52] U.S. Cl. ............................. 395/800; 364/DIG. 2; 364/943.9; 364/944.91; 364/728.03
[58] Field of Search ...................... 395/800, 550, 395/11; 364/152, 728.03, 736, 720, 728.06, 724.01, 574, 561, 730, 601

[56] References Cited

U.S. PATENT DOCUMENTS

| | | | |
|---|---|---|---|
| 4,244,026 | 1/1981 | Dickey, Jr. | 364/565 |
| 4,367,541 | 1/1983 | Seeman | 367/34 |
| 5,404,298 | 4/1995 | Wang et al. | 364/152 |

OTHER PUBLICATIONS

Richard L. Peskin et al., "Chaotic behavior of finite inertia particles in ABC flow", Physics of Fluids A, vol. 3, No. 5, Pt. 1, May 1991, USA.

Andrew M. Frazer, "Reconstructing Attractors from Scaler Time Series, A Comparison of Singular System and Redundancy Criteria", Physica D, Mar. 1989, Netherlands, vol. 34, No. 3, pp. 391–404.

H. Atmanspacher et al., "Global Scaling properties of a chaotic attractor reconstructed from experimental data", Physical Review A, vol. 37, No. 4, Feb. 15, 1988, USA.

Milan Palus et al., "Singular–value decomposition in attractor reconstruction: pitfalls and precautions", Physica D, vol. 55, No. 1–2, Feb. 1992, Netherlands.

*Primary Examiner*—Mehmet Geckil
*Attorney, Agent, or Firm*—Ostrolenk, Faber, Gerb & Soffen

[57] ABSTRACT

A chaos processor which is able to gain a dynamic of a dynamics system and to determine whether the dynamic is gained by a random noise or by the meaningful information. The chaos system having a strange attractor comprising a state value selecting unit for selecting the state value inputted according to an embedding dimension value and a delay time value; a distance calculating unit for calculating the distance between two state values selected by the state value selecting unit; an correlation sum calculating unit for calculating the correlation sum, in which the correlation sum calculating unit compares the calculated distance with a pre-stored distance index, increases the distance index when the distance index and a distance condition is satisfied, and calculates a sum of states in a circle having a radius corresponding to the increased distance index; an inflection point selecting unit for selecting points of inflection of a linearly increased parts from the calculated correlation sum; a correlation dimension calculating unit for calculating the correlation dimension by calculating a slope of a line which is made by connecting the inflection points selected.

7 Claims, 3 Drawing Sheets

CHAOS PROCESSOR FOR CALCULATING A CORRELATION DIMENSION

BACKGROUND OF THE INVENTION

1. Field of the Invention

The present invention relates to a chaos detection system, more particularly to a chaos processor which is able to determine whether an input signal is obtained from a random noise or from a meaningful information containing qualitative features of the strange attractor.

2. Description of the Prior Art

Recently, there have been active studies for seeking a process for estimating the future movements of the nature phenomena, such as the flow of water, air, and blood etc., the movement may be predetermined by the mathematical regularity of the movements gained.

Dynamics system can be defined as a system in which its states are varying with respect to time.

The dynamics system is called a stable system when the steady state solution remains in one point, which is in turn called an equilibrium point. When the attractor of the system makes a closed loop, the system is called a periodic system. When the attractor has a shape of doughnut, it is called a quasi-periodic system.

The procedure for obtaining the attractor of the dynamics system will be described as follows.

Generally, an nth order dynamics system have n state equations, and the state equations indicate the variation ratio of the states of the dynamics system against the variation of time as shown in equation (1).

$$dx1/dt = f(x1, x2, \ldots, xn), \ldots dxn/dt = f(x1, x2, \ldots, xn) \quad (1)$$

where, $f: R^N \rightarrow R^N$ stands for a nonlinear mapping, and $x1, x2, \ldots, xn$ stands for states respectively.

Hereinafter, a pendulum motion will be described as an elemental example of the dynamics system, the pendulum motion is expressed by 2 state equations in that the pendulum motion is a second order dynamics system as follows.

$dx1/dt = f(x1, x2)$ $dx2/dt = f(x1, x2)$

The solutions of the above state equations consist of a transient solution and a steady state solution. The steady state solution can be expressed in a state space, in which each state variable makes an axis of the state space, so as to express the steady state solution entirely.

Namely, the steady state solution at a given time can be expressed as a point in the state space. A set of the points presented in the state space is called an attractor of dynamics system.

If the given dynamics system has a finite state, i.e., a finite nth order dynamics system, the system has a four forms of the attractor. The dynamics systems are classified into four types according to the types of the attractor of the dynamics system.

Namely, the steady linear system which is the most simple dynamics system has one point attractor in the state space, which is called an equilibrium point. Also, the dynamics system having the steady state solution, and the solution being a periodic solution, has a closed loop-shaped attractor in the state space, which is then called a limit cycle.

And, the dynamics system having kth order subharmonic solution, which has a k periods, has a doughnut-shaped attractor. The doughnut is called a torus.

The attractor except those of the above-mentioned dynamics system is a strange attractor, and this type of dynamics system is called a chaos system.

Namely, the chaos system refers to a system having a strange attractor in the state space, with the exception of said one point attractor, said limit cycle, and said torus.

As mentioned above, the attractor may be constructed from the state equation which is presenting the state of the movements of the nature phenomena. In that case, all the n state equations are known in the nth order dynamics system, the attractor may be constructed easily.

In fact, however, it is practically impossible to access the whole n state equations let alone state variables, in a given nth order dynamics system. Accordingly, the endeavor has been devoted to construct the attractor of nth order dynamics system from only one state variable.

Namely, when an attractor is obtained from the steady state solution of a given state variable, the attractor may be presented in the state space.

Since the desired attractor may not be gained in the state space, an embedding space should be introduced.

As described above, the constructing of the attractor of the nth dynamics system from a given state variable is called an attractor reconstruction. The attractor reconstruction plays an important role among the researchers who are dependent upon the experiments.

The attractor reconstruction has been proposed by Floris Tarkens in the mid of 1980's.

And, the trace time is divided into the same periods, and the corresponding state value of the divided time is presented as an embedding vector g(t). The vector g(t) is satisfied with the following equation.

$$g(t) = \{y(t), y(t+\tau), \ldots, y(t+n\tau)\}$$

where, y(t) stands for a state value, $\tau$ is a delay time which is divided into the same periods, and n+1 is an embedding dimension.

If the delay time and the embedding dimension are fixed, the embedding vector is expressed as one point. And the delay time and the embedding dimension is altered, then the embedding vector draws a trace in the embedding space.

The embedding vector trace in the given nth order embedding space may not exactly the same as the trace of the attractor of the given dynamics system, but the embedding vector trace has relation with the trace of the original dynamics system in the qualitative viewpoint (pattern face).

However, it needs to determine whether the attractor is constructed from a random noise or the meaningful information from chaos system.

There are two kinds of methods for analyzing the reconstructed attractor, one is to analyze the qualitative feature of the reconstructed attractor, which is called a qualitative method, and the other is to analyze the degree of the pattern such as a slope of the attractor, which is called a quantitative method.

In case that said reconstructed attractor has a pattern of an equilibrium point, a limit cycle, and torus, it is possible to analyze the attractor only by the qualitative method. The strange attractor, however, is constructed by the reconstruction, it is impossible to determine whether the attractor is constructed from a noise or a meaningful information only by the qualitative process. Therefore, the strange attractor is analyzed by analyzing the quantitative feature of the attractor.

As described above, there are various methods in analyzing the quantitative feature of the reconstructed strange attractor such as the procedure for calculating the capacity of the strange attractor, the procedure for gaining a information dimension, and the procedure for gaining a correlation dimension and the like.

The process for calculating the capacity of the reconstructed strange attractor will be described hereinafter.

Assuming that the reconstructed strange attractor is covered with a volume element such as a sphere or a hexahedron with a radius r, and that the number of the volume element which is necessary to cover the entire attractor is N(r), the relation $N(r)=kr^D$ is satisfied.

In case that the radius(r) is reduced enough, then n(r) is solved with regard to the D, the capacity of the attractor ($D_{cap}$) is satisfied with the following equation.

$$\text{Capacity } (D_{cap}) = \lim_{r \to 0} \frac{\ln N(r)}{\ln(1/r)}$$

The process for gaining capacity of the attractor is performed by using the space, but it does not use the information accompanying the state variation of the given dynamics system.

Namely, the information dimension employs the following equation in analyzing the quantitative feature of the attractor which is reconstructed by using the information accompanying the state variation of the dynamics system.

$$\text{Information dimension } (D_r) = \lim_{r \to 0} \frac{\ln I(r)}{\ln(1/r)}$$

$$\text{Where, } I(r) = -\sum_{i=1}^{N(r)} P_i \ln P_i.$$

The $P_i$ stands for a probability in which the trace enters into the nth volume element, and δ(r) stands for an entropy of the dynamics system.

In the meanwhile, the most convenient procedure for analyzing the quantitative feature of the reconstructed attractor is to gain a correlation dimension, the procedure will be described with detail hereinafter.

It is gained that the number of the states in the circle having a radius (Ri) which corresponds to the distance between a state(Xi) and other state(Xj). The gained number of the states is divided by the square number of the state value (N) of the attractor, that is $N^2$. The whole number (N) is approached to a infinite, then the correlation sum of a state(X1) can be obtained.

That is, correlation sum $(C(R))= \lim 1/N^2$ {the number of state(Xi, Xj) such that $\|X_i-X_j\|<R\}$.

With the above calculated correlation sum (C(R)), the correlation dimension (Dc) can be calculated by using the following equation.

$$\text{Correlation dimension} = \lim_{R \to 0} \frac{\ln C(R)}{\ln (R)}$$

The correlation dimension (Dc) stands for a slope of the linear part of the graph of the correlation sum (C(R)) which is calculated by the equation (1).

Namely, the graph of the correlation sum (C(R)) calculated by the equation (1) is plotted in a form convergent toward a certain value. However, the attractor which is constructed by the noise is plotted in a divergent form.

And, the correlation dimension (Dc) of the attractor is obtained from the slope of the linear part of the graph which is gained by the equation (1).

As described above, in the analyzing process for a quantitative feature of the reconstructed strange attractor, the circuit seeking the correlation dimension is called a chaos processor.

In the prior art, the chaos processor has had a great large amount of calculation works, in that the correlation sum is to be obtained from the whole states (X1, X2, ..., Xn). Namely, in order to get a correlation sum, the calculation which is equivalent to the square number of the whole states ($N^2=N(N-1)/2$) is needed. Particularly, the more the number of the state value, a common computer does not process the matter in a reasonable time.

SUMMARY OF THE INVENTION

It is therefore an object of the invention to provide a chaos processor in which an exclusive processor for calculating a correlation dimension of the states of the attractor is realized by a hardware.

In order to achieve the above object, the present invention includes two shift registers which are adapted to select the state value which is inputted according to an embedding dimension value and a delay time value; a distance calculating unit which is adapted to calculate the distance (Ri) between two state values (Xi, Xj) selected by the state value selecting unit; a correlation sum calculating unit which is adapted to calculate the correlation sum, in which the correlation sum calculating unit compares the calculated distance (Ri) with a pre-stored distance index (di), increases the distance index when the distance index (di) and a distance (Ri) condition is satisfied, and calculates a sum of states (Ndi) in a circle having a radius corresponding to the increased distance index(di); an inflection point selecting unit which is adapted to select points of inflection of a linearly increased parts from the calculated correlation sum; a correlation dimension calculating unit which is adapted to calculate the correlation dimension by calculating a slope of a line which is made by connecting the inflection points selected.

BRIEF DESCRIPTION OF THE DRAWINGS

The various features and advantages of the present invention may be more readily understood with reference to the following detailed description taken in conjunction with the accompanying drawings.

DETAILED DESCRIPTION OF THE PREFERRED EMBODIMENTS

Figure 1:
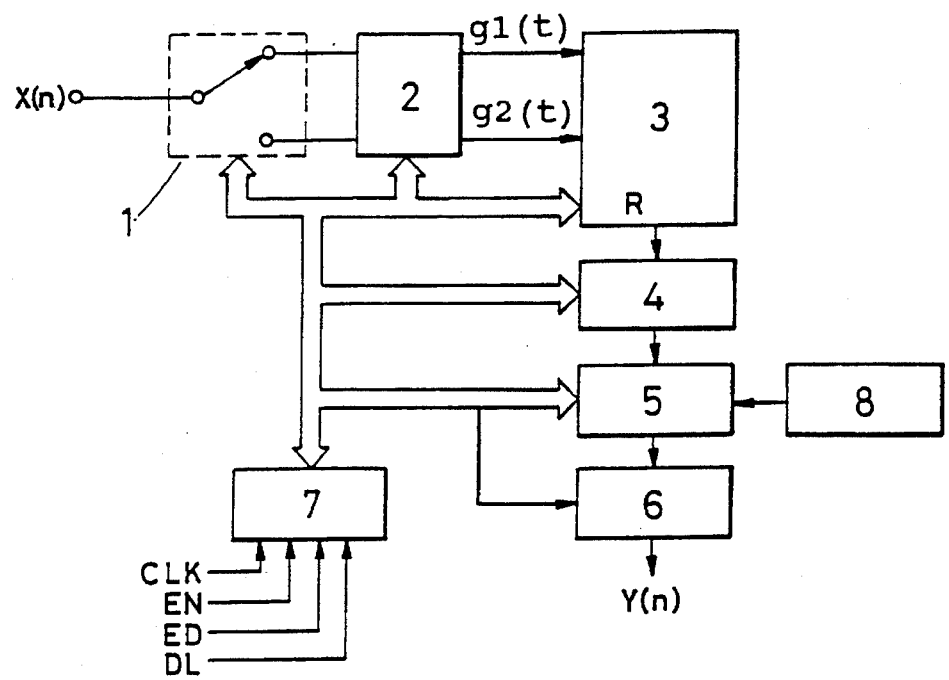
FIG. 1 shows a block diagram of a chaos processor according to a first embodiment of the present invention.

Referring to the drawing figures, FIG. 1 shows a block diagram of a chaos processor according to a first embodiment of the present invention. The chaos processor according to a first embodiment of the present invention comprises a switching unit (1) that is adapted to switch a state value of the chaos processor, which is to be analyzed, sequentially according to a time and to output the state value; two shift registers as a state value selecting unit (2) that is adapted to select a state value out of the switching unit (1) in order to construct embedding vectors [g(t)] on the basis of an embedding dimension (ED) and a delay time (DL); a distance calculating unit (3) that is adapted to calculate a distance ($R_{ij}$) on the basis of the two selected embedding vectors [g1(t)], [g2(t)] which are selected at the state value selecting unit (2) and to output the distance (Ri); a correlation sum calculating unit (4) that is adapted to compare the distance (Ri) out of the distance calculating unit (3) and a pre-stored distance indexes (d), and to output a correlation sum (Nd) corresponding to a distance index which meets to a given distance condition; a inflection point determining unit (5) which is adapted to determine a suitable inflection point of said correlation sum which is out of said correlation sum calculating unit (4); a slope calculating unit (6) which is adapted to calculate a slope of a line which is made by connecting inflection points, and to output a correlation dimension (Dc); and a control unit (7) which is adapted to control the switching unit (1), the state value selecting unit (2), the distance calculating unit (3), the correlation sum calculating unit (4) and the linear region detecting unit (5) in response to an input clock (CLK), an enable signal (E), an embedding dimension (ED) and a delay time (DL).

A setting unit (8), which is adapted to input an optimum inflection point from outside, is connected to other input of said determining unit (5).

Hereinafter, it will be described an operation of the first embodiment of the present invention with an example of an embedding dimension (ED)=1, a delay time (DL)=τ=Δt.

When a state of the chaos system having strange attractor is to a chaos processor, the inputted state (X(n)) is applied to the state selecting unit (2) through the switching unit (1) which is adapted to switch according to a control signal out of the control unit (7).

Assuming that the initial state value of the inputted (X(n)) is a X(t0), the initial state value X(t0) is applied to the state selecting unit (2) through the switching unit (1), and a state value which is inputted continuously at every delayed time (τ) is applied to the state selecting unit (2) through the switching unit (1).

Namely, the initial state value (X(t0)) is inputted to one of said two shift registers, then a data value (X(t0+Δt)) of the delay time (t0+Δt) is inputted to the other of two shift registers, the other of said two shift registers, (X(t0), X(t0+Δt)) are applied to the distance calculating unit (3) as embedding vectors g1(t), g2(t) according to a control signal out of the control unit (7).

With the embedding vectors (X(t0), X(t0+Δt)), a distance between two embedding vectors (X(t0), X(t0+Δt)) is calculated in said distance calculating unit (3). In this occasion, since the embedding dimension (ED) is 1, and the delay time (τ) is Δt, the distance (R1) is obtained from the following equation.

$$\text{Distance } (R1) = \sqrt{[X(t0) - X(t0 + \Delta t)]^2}$$

The calculated distance (R1) is applied to the correlation sum calculating unit (4) which compares said distance (R1) and pre-stored distance indexes (d).

Namely, the increased distance index (dj) is satisfied with the following equation (2).

$$\text{Distance index } (dj) = di + 1 \qquad (2)$$

where, i≤j.

The above process is performed in delay time (Δt). At the switching unit (1), the state value (X(t0+2Δt)) inputted at a moment in which the delay time is 2Δt is supplied to the embedding vector selecting unit (2). With the inputted state value (t0+2Δt)) and the initial state value (S(t0)), the distance (R2) between the embedding vectors is outputted at the distance calculating unit (3).

The outputted distance (R2) is compared with the pre-stored distance indexes (d) through the correlation sum.

Above described process is performed repeatedly with a whole state values which are inputted according to the time delay. When a number of the state (Ndj), which is presented in a circle having a diameter corresponding to the increased distance index, reaches a predetermined final number (Dmax), the inputted state value is no more applied to the state value selecting unit (2).

Namely, in case that the number of the state (Ndj) presented in a circle having a diameter which corresponds to the distance index (dj) reaches the final number (Max) through above described correlation sum calculating unit (4), the control signal from the control unit (7) is supplied to the switching unit (1) in order to disable it. By the switching of the switching unit (1), the state value may be prevented from being inputted to the state value selecting unit (2).

The inflection point may be selected as a distance index (di)(dj) which is predetermined from said determining unit (5), or the user may set the inflection point through a setting unit (8) outside.

In order to obtain the inflection point with said setting unit (8), when the distance index is predetermined through the linear region detecting unit (5), a distance index is selected from the distance indexes (di)(dj). The distance index which is satisfied with a minimum distance between said predetermined distance index and a line made by connecting said selected distance index to any other index is searched. Once the distance index is searched, a process is performed in which the searched distance index is set as an inflection point to determine a suitable inflection point. In order to obtain the optimum inflection point with said setting unit (8), an optimum inflection point which is predetermined experimentally in the dynamics system to be analyzed is determined from outside.

The inflection point determined as above is supplied to the linear region detecting unit (5). In the slope calculating unit (6), with an X-Y coordinate plane which is made by a distance index axis (d-axis) and an accumulated state value number axis (Nd) respectively, the state value number being presented in a circle with a diameter equivalent to the distance index.

In this occasion, the slope is calculated by using the following equation (3).

$$\text{Slope} = (\log (Ndj) - \log (Ndi))/(\log (dj) - \log (di)) \qquad (3)$$

The above calculated slope is a correlation dimension of the chaos system, the slope is in turn a final output (Y(n)) of the chaos processor.

As described above, the correlation dimension of the chaos system, which is obtained on the assumption that the embedding dimension (ED) is 1, and the delay time (DL) is Δt, refers to a correlation dimension according to a pointwise process.

Figure 2:
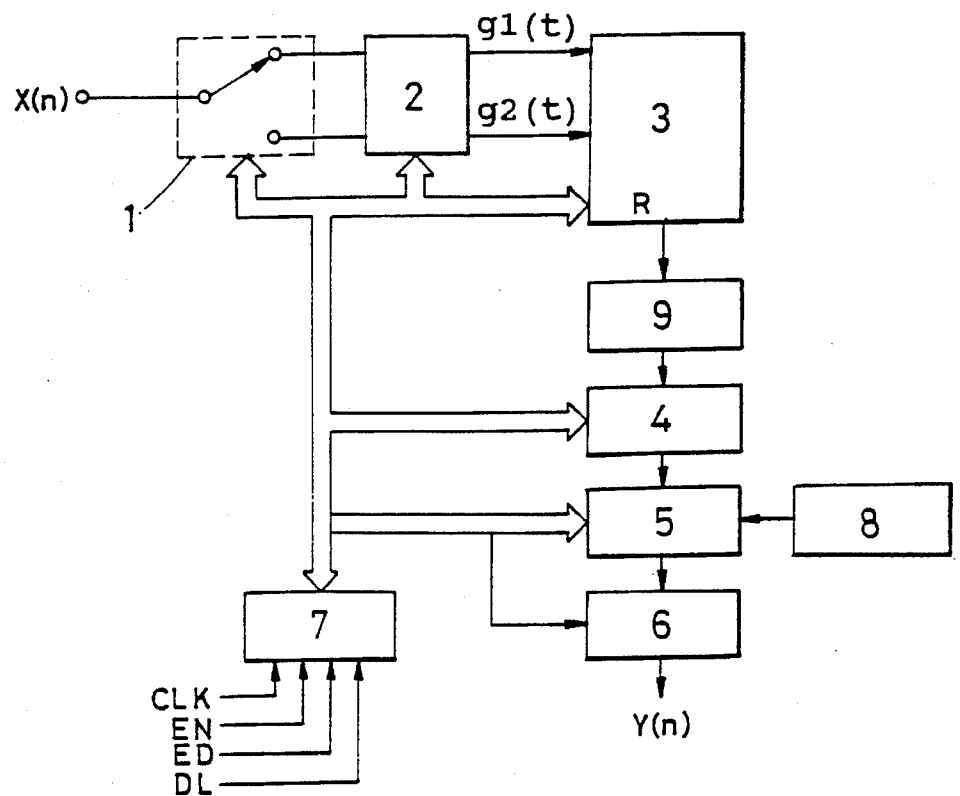
FIG. 2 shows a block diagram of a chaos processor according to a second embodiment of the present invention.
Figure 3:
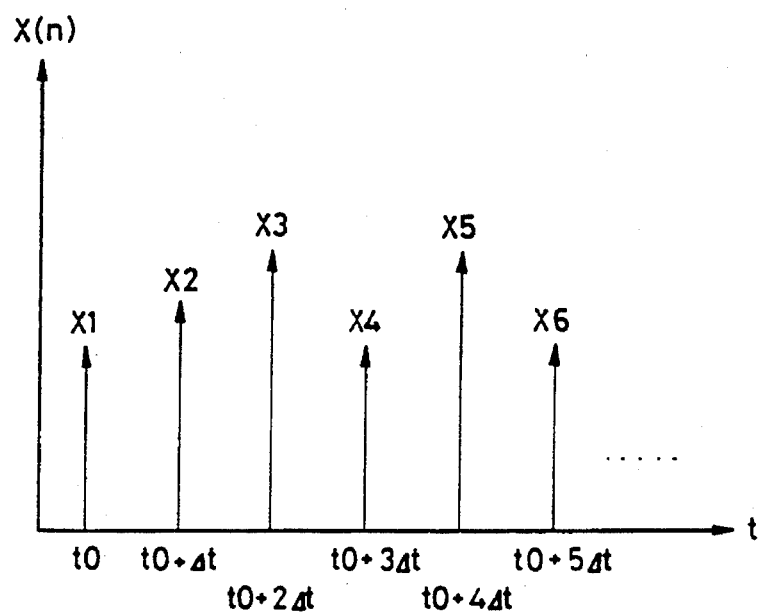
FIG. 3 shows a time-state diagram which is plotting an example of the state value inputted to a chaos processor in accordance with the principles of the present invention.
Figure 4:
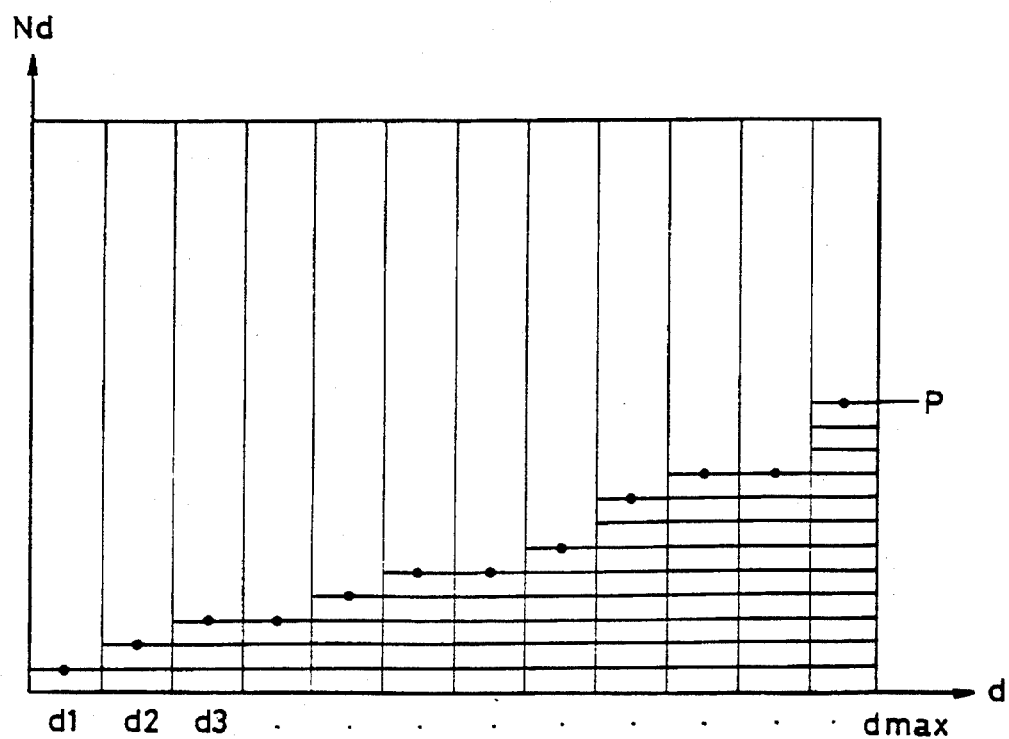
FIG. 4 shows a diagram of a distance index (Di, Dj)-a number of state representing the correlation sum which is calculated through the chaos of the present invention.

FIG. 2 shows a block diagram of a chaos processor according to a second embodiment of the present invention. To the output side of the calculating unit (3) as shown in FIG. 1, a distance value converter (10) is connected. The distance value converter converts an inputted distance into an integer and applys it to the correlation sum calculating unit (4). Other elements have same construction as shown in FIG. 1.

Namely, the distances (R1, R2, ... ,Rn) from said distance calculating unit (3) have a floating point value, which is applied to the distance correlation sum calculating unit (4), and increases an amount of calculation work greatly. This leads to a delay of the calculation speed.

In this regard, it is necessary to convert the distances (R1, R2, ... , Rn) having the floating point through the distance value converter (10) into an integer to be applied to said correlation sum calculating unit (4).

It is desirable to convert the inputted distance (Ri) into an integer by applying a log function ($\log_2 Rij$) to the distance (Ri) in said distance value converter (10).

Accordingly, the correlation sum calculating unit (4) compares the inputted integer distance (Ri) with the distance index so that the calculating unit (4) can perform said calculation at a very high speed to increase the number of the state value presented in the corresponding distance index.

The slope calculated in said slope calculating unit (6) is obtained from the following equation (4).

$$\text{Slope} = (\log(Ndj) - \log(ndj))/(dj - di)) \quad (4)$$

Figure 5:
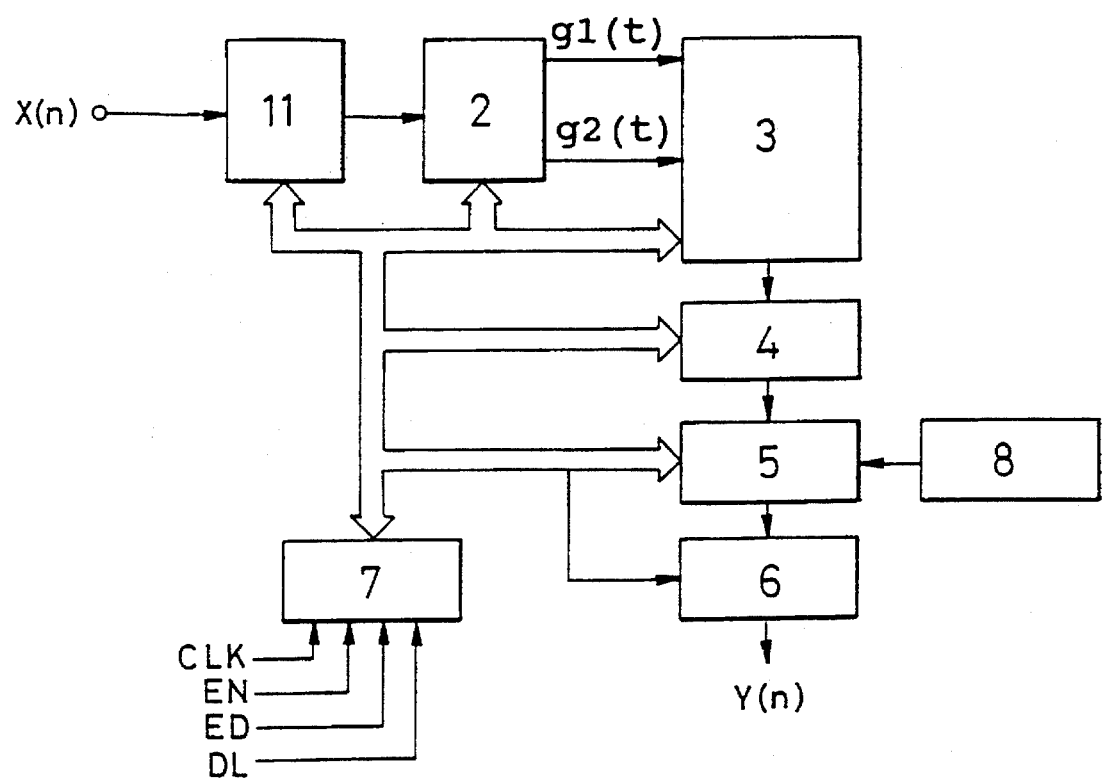
FIG. 5 shows block diagram of a chaos processor according to a third embodiment of the present invention.

FIG. 5 shows block diagram of a chaos processor according to a third embodiment of the present invention. As shown in FIG. 5, the third embodiment of the invention has the same elements as those of FIG. 1, such as a state value selecting unit (2), a distance calculating unit (3), a correlation sum calculating unit (4), linear region detecting unit (5), a slope calculating unit (6), a control unit (7), and a setting unit (8) except that a memory unit (11) is further included in this third embodiment to store the whole inputted state value (X(n)).

Assuming that the embedding dimension (ED) is n and said delay time (DL=$\tau$) is $p\Delta t$, at a given time (t=t0) and the nth order chaos system, the state value stored in said memory unit (11) is outputted from said state value output unit (12) for a time of $(n-1)p\Delta t$.

The process may be expressed by a formula as follows.

$$Xi = [X(t0), X(t0+p\Delta t), \ldots, X(t0+(n-1)p\Delta t)]$$

And, at $t=t0+\Delta t$, the state value can be expressed as follows.

$$Xj = [X(t0+\Delta t), X(t0+(p+1)\Delta t), \ldots, X(t0+ np\Delta t)]$$

With the above described state value, the distance value (R1) can be calculated through an equation [Xj—Xj].

From said calculated distance, as described in connection with the FIG. 1, the correlation dimension (Y(n)) of the chaos system can be obtained through said correlation calculating unit (4), said linear region detecting unit (5), said slope calculating unit (6), and said control unit (7). Said correlation dimension (Y(n)) refers to a correlation dimension according to a full method.

According to the present invention as described in detail, it is possible to perform a calculation in a reasonable time in that the chaos processor, which is adapted to analyze the quantitative feature of the strange attractor of the chaos system, is constructed with a hardware. Moreover, said distance value can be converted to an integer value to reduce the processing time of the chaos processor.

What is claimed is:

1. A chaos processor for calculating a correlation dimension for qualitatively analyzing quantitative features of a chaotic dynamical system having a reconstructed strange attractor from input state value data of the chaotic dynamic system, the processor comprising:

state value selecting means for selecting inputted state values of a chaotic dynamical system according to an embedding dimension value and a delay time value, respectively;

distance calculating means for calculating a distance between each two of said state values respectively selected by said state selecting means;

correlation sum calculating means for calculating a correlation sum by comparing said distance calculated by said distance calculating means with pre-stored distance indexes and outputting as said correlation sum a one of said distance indexes which meets a given distance condition and for increasing a value of the distance index by one when the distance being compared is greater than the value of said distance index;

inflection point selecting means for selecting points of inflection of a linearly increased region of said correlation sum;

correlation dimension calculating means for calculating a slope of a line connecting said selected inflection points and outputting said calculated slope as a correlation dimension of the chaotic system whereby when a correlation dimension determined in accordance with said outputted correlation sum is convergent upon a certain predetermined value said input state values are evaluated as meaningful information representing qualitative features of said strange attractor and when said correlation dimension is divergent with respect to said predetermined value said input state values are evaluated as random noise.

2. A chaos processor according to claim 1, wherein said chaos processor further comprises converter means for converting said distance calculated by said distance calculating means into an integer value.

3. A chaos processor for calculating a correlation dimension of claim 2, wherein said distance is converted into said integer value by applying a log function to a value of said distance.

4. A chaos processor according to claim 1, wherein said chaos processor further comprises memory means for storing all input state values to be selected by said state value selecting means for determining said correlation dimension by a complete operation of said chaos processor.

5. A chaos processor for calculating a correlation dimension of claim 1, wherein said linear region is detected by inflection points of said line made by said correlation sum values.

6. A chaos processor for calculating a correlation dimension of claim 1, wherein said chaos processor further comprises means for inputting optimum inflection points which are calculated previously.

7. A chaos processor for calculating a correlation dimension of claim 1, wherein said state value selecting means includes two shift registers which temporarily store respective time-sequential input state value and are switched by a switch in sequence.

* * * * *